United States Patent
Futa, Jr. et al.

(10) Patent No.: US 7,966,995 B2
(45) Date of Patent: Jun. 28, 2011

(54) DUAL LEVEL PRESSURIZATION CONTROL BASED ON FUEL FLOW TO ONE OR MORE GAS TURBINE ENGINE SECONDARY FUEL LOADS

(75) Inventors: Paul W. Futa, Jr., North Liberty, IN (US); Gregory A. Lafferty, Plymouth, IN (US); David J. Lawrence, South Bend, IN (US); David J. Tuttle, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 1235 days.

(21) Appl. No.: 11/850,302

(22) Filed: Sep. 5, 2007

(65) Prior Publication Data

US 2010/0263634 A1 Oct. 21, 2010

(51) Int. Cl.
*F02M 37/04* (2006.01)
*F02M 37/00* (2006.01)
(52) U.S. Cl. ..................... 123/511; 60/39.281
(58) Field of Classification Search ........... 123/511, 123/457, 495, 510, 512; 60/39.01, 39.281, 60/734; 137/535
See application file for complete search history.

(56) References Cited

U.S. PATENT DOCUMENTS

| | | | |
|---|---|---|---|
| 5,809,771 A * | 9/1998 | Wernberg | 60/39.094 |
| 6,321,527 B1 | 11/2001 | Dyer et al. | |
| 6,666,014 B2 | 12/2003 | Maillard et al. | |
| 6,928,986 B2 | 8/2005 | Niethammer et al. | |
| 7,128,058 B2 | 10/2006 | Yamamoto | |
| 2006/0053796 A1 * | 3/2006 | Shelby et al. | 60/734 |

* cited by examiner

*Primary Examiner* — Mahmoud Gimie
(74) *Attorney, Agent, or Firm* — Ingrassia Fisher & Lorenz, P.C.

(57) ABSTRACT

A system and method provide dual level pressurization control of a fuel supply system based on whether fuel is being supplied to one or more secondary fuel loads. Fuel pump discharge backpressure is maintained above either a first minimum pressure value or a lower second minimum pressure value by determining whether fuel is being supplied to one or more secondary fuel loads. The fuel pump discharge pressure is maintained above the first minimum pressure value if it is determined that fuel is being supplied to the one or more secondary loads. The fuel pump discharge backpressure is maintained above the lower second minimum pressure value if it is determined that fuel is not being supplied to the one or more secondary loads.

20 Claims, 2 Drawing Sheets

DUAL LEVEL PRESSURIZATION CONTROL BASED ON FUEL FLOW TO ONE OR MORE GAS TURBINE ENGINE SECONDARY FUEL LOADS

TECHNICAL FIELD

The present invention generally relates to gas turbine engine fuel pressurization control and, more particularly, to a system and method for implementing dual level pressurization control based on whether fuel is being supplied to one or more secondary fuel loads.

BACKGROUND

Typical gas turbine engine fuel supply systems include a fuel source, such as a fuel tank, and one or more pumps. The one or more pumps draw fuel from the fuel tank and deliver pressurized fuel to one or more primary fuel loads and to one or more secondary fuel loads via one or more supply lines. Generally, the primary fuel loads, which include the fuel manifolds in the engine combustor, are supplied with fuel via, for example, a priority flow line. The secondary fuel loads, which may include a motive flow valve and regulator, one or more variable geometry actuators, and one or more bleed valves, are supplied with fuel via, for example, a secondary flow line.

The priority flow line may include one or more valves in flow series between the pumps and the fuel manifolds. These valves generally include at least a metering valve and a pressurizing valve. The metering valve is typically configured to control priority flow to the one or more primary fuel loads. The pressurizing valve, which is typically disposed downstream of the metering valve, functions to maintain a minimum system pressure magnitude in portions of the supply lines. More specifically, the pressurizing valve typically maintains pump discharge backpressure above a minimum pressure magnitude.

In some systems, when the one or more secondary fuel loads are being supplied with fuel, the minimum pump discharge backpressure may need to be higher than what is needed for a given priority flow level. One solution to this is to maintain the minimum pump discharge backpressure at the higher level at all times to accommodate the secondary flow requirements. This solution, however, may exhibit certain undesirable drawbacks. For example, this solution can make the scheduling of priority flow difficult during engine start up. This solution may also generate excessive fuel system heat, and may increase horsepower consumption by the one or more pumps.

Hence, there is a need for a system and method of controlling gas turbine engine fuel pressurization that does not cause difficulty in the scheduling of priority flow during engine start up and/or does not result in excessive fuel system heat generation and/or does not increase horsepower consumption by the one or more fuel pumps. The present invention addresses one or more of these needs.

BRIEF SUMMARY

In one embodiment, and by way of example only, a fluid pressurization control system includes a secondary flow control valve and a pressurizing valve. The secondary flow control valve includes an inlet port and an outlet port. The inlet port is adapted to receive fuel discharged from a fuel pump. The secondary flow control valve is movable between a closed position, in which the inlet port is fluidly isolated from the outlet port, and an open position, in which the inlet port is in fluid communication with the outlet port. The pressurizing valve is adapted to receive fuel discharged from the fuel pump at a pump discharge backpressure, is in fluid communication with at least the secondary flow control valve outlet port, and includes a control pressure select piston and a pressure control piston. The control pressure select piston is responsive, at least in part, to fuel pressure at the secondary flow control valve outlet port to move between a first position and a second position. The pressure control piston is controllably movable to maintain the pump discharge backpressure above a first value when the control pressure select piston is in the first position, and above a second value when the control pressure select piston is in the second position.

In another exemplary embodiment, a fuel supply and control system includes a fuel pump, a metering valve, a secondary flow control valve, and a pressurizing valve. The fuel pump is adapted to receive fuel at a pump inlet pressure and supply the fuel at a pump discharge backpressure. The metering valve is in fluid communication with the fuel pump to receive at least a first portion of the fuel supplied therefrom. The metering valve is configured to control fuel flow to one or more primary fuel loads. The secondary flow control valve includes an inlet port and an outlet port. The inlet port is in fluid communication with the fuel pump to receive at least a second portion of the fuel supplied therefrom. The secondary flow control valve is movable between an open position, in which the inlet port is in fluid communication with the outlet port and fuel is supplied to one or more secondary fuel loads, and a closed position, in which the inlet port is fluidly isolated from the outlet and fuel is not supplied to the one or more secondary fuel loads. The pressurizing valve is in fluid communication with the metering valve and the secondary flow control valve outlet port, and includes a control pressure select piston and a pressure control piston. The control pressure select piston is responsive, at least in part, to fuel pressure at the secondary flow control valve outlet port to move between a first position and a second position. The pressure control piston is controllably movable to maintain the pump discharge backpressure above a first value when the control pressure select piston is in the first position, and above a second value when the control pressure select piston is in the second position.

In yet a further exemplary embodiment, a method of maintaining fuel pump discharge backpressure above either a first minimum pressure value or a lower second minimum pressure value in a fuel supply system that is configured to selectively supply fuel to one or more primary fuel loads and one or more secondary fuel loads includes the step of determining whether fuel is being supplied to the one or more secondary loads. The fuel pump discharge pressure is maintained above the first minimum pressure value if it is determined that fuel is being supplied to the one or more secondary loads. The fuel pump discharge backpressure is maintained above the lower second minimum pressure value if it is determined that fuel is not being supplied to the one or more secondary loads.

Other desirable features and characteristics of the pressurization control system and method will become apparent from the subsequent detailed description and the appended claims, taken in conjunction with the accompanying drawings and the above background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although an embodiment of the invention is described as being implemented in an aircraft and for a gas turbine engine, it will be appreciated that the invention may be implemented in numerous and varied end-use environments where fuel flow to primary and secondary fuel loads is controlled.

Figure 1:
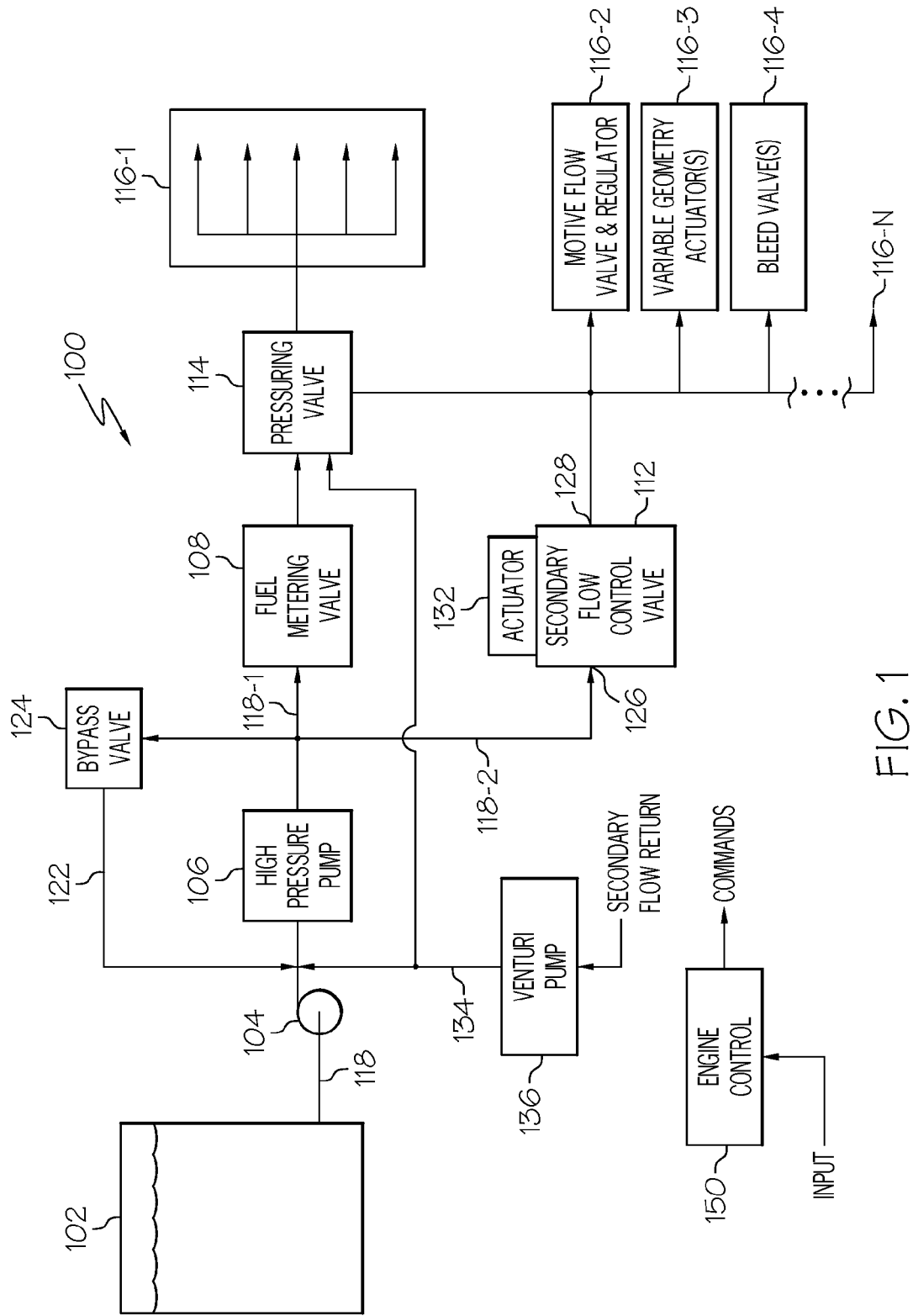
FIG. 1 is a simplified schematic diagram of an exemplary embodiment of a fuel delivery and control system for a gas turbine engine.

Turning now to FIG. 1, a simplified schematic diagram of one embodiment of a fuel delivery and control system for a gas turbine engine, such as a turbofan jet aircraft engine, is depicted. The system 100 includes a fuel source 102, one or more pumps 104, 106, a fuel metering valve 108, a secondary flow control valve 112, a pressurizing valve 114, and an engine control 150. The fuel source 102, which is preferably implemented as one or more tanks, stores fuel that is to be supplied to a plurality of fuel loads 116 (e.g. 116-1, 116-2, 116-3, ... 116-N). It will be appreciated that the number and type of fuel loads may vary, and may include one or more of a gas turbine engine combustor zone and associated nozzles 116-1, a motive flow valve and regulator 116-2, one or more variable geometry actuators 116-3, and one or more bleed valves 116-4, just to name a few. The fuel loads 116 are preferably classified as primary and secondary fuel loads based, for example, on functionality. Though the classifications may vary, the gas turbine engine combustor zone and associated nozzles 116-1 are typically classified as primary fuel loads, and the motive flow valve and regulator 116-2, the one or more variable geometry actuators 116-3, and the one or more bleed valves 116-4 are typically classified as secondary fuel loads.

A supply line 118 is coupled to the fuel source 102 and, via the pumps 104, 106, delivers the fuel to the fuel loads 116. It is noted that the supply line 118 is, for convenience, depicted and described as a priority flow line 118-1 and a secondary flow line 118-2. The priority flow line 118-1 preferably delivers fuel to the primary fuel loads (e.g., 116-1), and the secondary flow line 118-2 preferably delivers fuel to the secondary fuel loads (e.g., 116-2, 116-3, 116-4, ... 116-N).

Each of the one or more pumps 104, 106 is positioned in flow-series in the supply line 118 and take a suction on the fuel source 102. In the depicted embodiment, two engine-driven pumps are used and include a boost pump 104, such as a relatively low horsepower centrifugal pump, and a high pressure pump 106, such as a positive displacement pump, a centrifugal pump, or a variable displacement piston pump. The boost pump 104 takes a suction directly on the fuel source 102 and provides sufficient suction head for the high pressure pump 106. The high pressure pump 106 then supplies the fuel at a relatively high pressure to the priority flow line 118-1 and the secondary flow line 118-2. Although not depicted, it will be appreciated that the system 100 may additionally include a low pressure pump within the fuel tank(s) 102 to supply fuel to the boost pump 104. It will additionally be appreciated that one or both of the pumps 104, 106 may be driven by an electric motor, rather than the engine.

The fuel metering valve 108 is positioned in flow-series in the priority flow line 118-1 downstream of the high pressure pump 106. The fuel metering valve 108 is coupled to receive fuel flow command signals supplied from, for example, the engine control 150. The fuel metering valve 108 is operable, in response to the fuel flow command signals, to control the flow of fuel to the gas turbine engine combustor zone and associated nozzles 116-1. It will be appreciated that in some embodiments the system 100 may be implemented without the fuel metering valve 108.

As FIG. 1 further depicts, the system 100 additionally includes a bypass flow line 122 and a bypass valve 124. The bypass flow line 122, at least in the depicted embodiment, is coupled to the supply line 118 between the high pressure pump 106 and the fuel metering valve 108. The bypass valve 124 is disposed in the bypass flow line 122 and is operable to selectively bypass a portion of the fuel in the supply line 118 away from the fuel metering valve 108 and back to the inlet of the high pressure pump 106. It will be appreciated that in other embodiments, the bypass flow line 122 may be connected to the inlet of the booster pump 104 or to the fuel source 102, rather than the inlet of the high pressure pump 106. The bypass valve 124 is preferably controlled in response to bypass valve commands. These bypass valve commands may be electrical or hydraulic, and may be supplied from either the fuel metering valve 108 or the engine control 150. As with the fuel metering valve 108, it will be appreciated that in some embodiments the system 100 may be implemented without the bypass flow line 122 and/or bypass valve 124.

The secondary flow control valve 112 is disposed in the secondary flow line 118-2 downstream of the high pressure pump 106, and is configured to selectively allow fuel flow to, or shut off fuel flow from, the secondary fuel loads 116-2, 116-3, 116-4, ... 116-N. More specifically, the secondary flow control valve 112 includes an inlet port 126 and an outlet port 128. The inlet port 126 is in fluid communication with, and receives a portion of the fuel discharged from, the high pressure pump 106. The outlet port 128 is in fluid communication with the secondary fuel loads 116-2, 116-3, 116-4, ... 116-N via the remainder of the secondary flow line 118-2. The secondary flow control valve 112 is movable, via a valve actuator 132, between a closed position and an open position. In the closed position, the inlet port 126 is fluidly isolated from the outlet port 128, and thus fuel is not supplied to the secondary fuel loads 116-2, 116-3, 116-4, ... 116-N. Conversely, in the open position, the inlet port 126 is in fluid communication with the outlet port 128, and thus fuel is supplied to the secondary fuel loads 116-2, 116-3, 116-4, ... 116-N.

The fuel that is supplied to the secondary fuel loads 116-2, 116-3, 116-4, ... 116-N is ultimately returned to the fuel supply line 118. In the depicted embodiment the fuel is returned from the secondary fuel loads 116-2, 116-3, 116-4, ... 116-N to the fuel supply line 118 via a return line 134 and a venturi pump 136. The return line 134 is coupled to the supply line 118 upstream of the high pressure pump 106. It will be appreciated, however, that the return line 134 could be coupled to the supply line 118 at any one of numerous other locations. The venturi pump 136 is disposed in the return line 134 and delivers the fuel supplied to the secondary fuel loads 116-2, 116-3, 116-4, . . . 116-N back to the supply line 118.

The pressurizing valve 114 is disposed in the primary flow line 118-1 upstream of the primary fuel loads 116-1 and, if included, is in fluid communication with the fuel metering valve 108. As FIG. 1 also depicts, the pressurizing valve 114 is additionally in fluid communication with the secondary flow control valve outlet port 128, and the supply line 118 upstream of the high pressure pump 106. The pressurizing valve 114 is configured to maintain a minimum pump discharge backpressure downstream of the high pressure pump 106, and shuts when the pressure falls below this minimum pump discharge backpressure. More specifically, and as will be described in more detail further below, the pressurizing valve 114 is configured to maintain pump discharge backpressure above either a first minimum pressure value or a second minimum pressure value that is lower than the first minimum pressure value. The pressurizing valve 114 will maintain pump discharge backpressure above the first minimum pressure value if the secondary flow control valve 112 is open and fuel is being supplied to the one or more secondary loads 116-2, 116-3, 116-4, . . . 116-N. Conversely, if the secondary flow control valve 112 is closed and fuel is not being supplied to the one or more secondary loads 116-2, 116-3, 116-4, . . . 116-N, the pressurizing valve 114 will maintain fuel pump discharge backpressure above the second minimum pressure value.

The engine control 150, which may be, for example, a Full Authority Digital Engine Controller (FADEC), controls the overall operation of the gas turbine engine (or engines), including the flow of fuel from the fuel source 102 to the fuel loads 116. The engine control 150 preferably receives various input signals and supplies commands to one or more of the pumps 104, 106, the fuel metering valve 108, and the bypass valve 124, to thereby control the fuel flow rate to the combustor nozzles 116-1. The engine control 150 may also supply one or more commands to the valve actuator 132 to move the secondary flow control valve 112 between the open and closed positions, and thereby selectively allow or prevent fuel flow to the secondary fuel loads 116-2, 116-3, 116-4, . . . 116-N.

Figure 3:
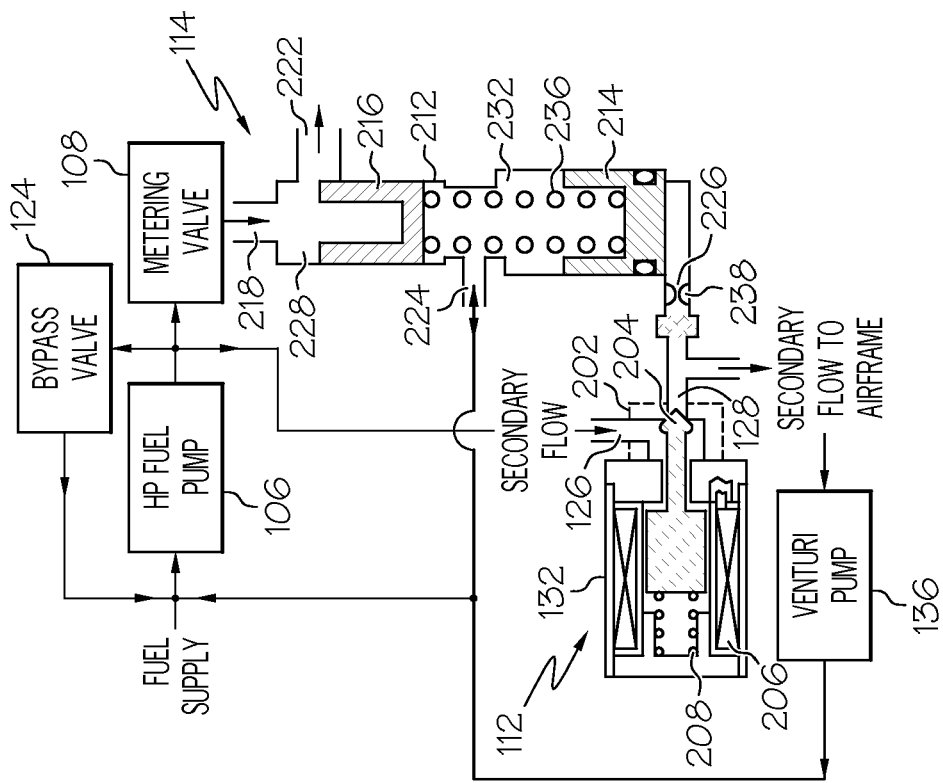
FIG. 3 is a schematic diagram similar to that shown in FIG. 2, but depicting the configuration of the pressurization control valve and the secondary flow control valve when fuel is not being supplied to one or more secondary fuel loads.
Figure 2:
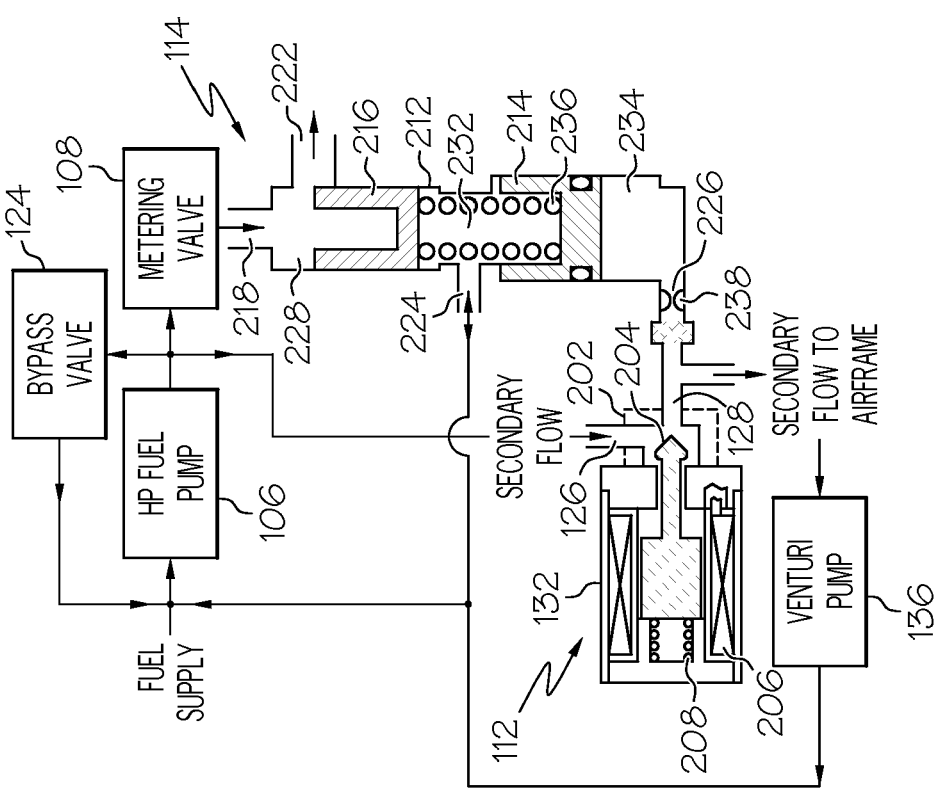
FIG. 2 is a schematic diagram depicting, in detail, an exemplary pressurization control valve and an exemplary secondary flow control valve coupled to portions of the fuel delivery and control system of FIG. 1, and depicting the configuration of a pressurization control valve and a secondary flow control valve when fuel is being supplied to one or more secondary fuel loads.

The secondary flow control valve 112 and the pressurizing valve 114 may each be variously configured to implement the respective functionalities described above. Particular preferred configurations of the secondary flow control valve 112 and the pressurizing valve 114 are depicted in FIGS. 2 and 3, and will now be described in more detail. Before doing so, however, it is noted that like reference numerals in FIGS. 1-3 refer to like system, sub-systems, and components.

Referring to FIGS. 2 and 3 together, it is seen that the secondary flow control valve 112 includes a valve body 202, a valve element 204, and the previously mentioned inlet port 126, outlet port 128, and valve actuator 132. The inlet port 126 and outlet port 128 are both formed in the valve body 202. The valve element 204 is disposed in the valve body 202 and is coupled to the valve actuator 132. The valve element 204 is movable between an open position, which is the position shown in FIG. 2, and a closed position, which is the position shown in FIG. 3. The valve element 204 is moved between the open and closed positions via the valve actuator 132.

Although the valve actuator 132 may be variously configured and variously implemented, in the depicted embodiment the valve actuator 132 is implemented using a spring-loaded solenoid that is selectively energized and de-energized. The spring-loaded solenoid includes solenoid coils 206 and a spring 208. When the solenoid coils 206 are energized, the valve element 204 is moved, against a spring force supplied from a spring 208, into the open position. When the solenoid coils 206 are de-energized, the spring 208 moves the valve element 204 into the closed position. Consistent with the general discussion above, when the valve element 204 is in the closed position, the inlet port 126 is fluidly isolated from the outlet port 128, and thus fuel is not supplied to the secondary fuel loads 116-2, 116-3, 116-4, . . . 116-N. Conversely, when the valve element is in the open position, the inlet port 126 is in fluid communication with the outlet port 128, and thus fuel is supplied to the secondary fuel loads 116-2, 116-3, 116-4, . . . 116-N.

The pressurizing valve 114 includes a valve body 212, a control pressure select piston 214, and a pressure control piston 216. The control pressure select piston 214 is movably disposed within the valve body 212 and is responsive, at least in part, to fuel pressure at the secondary flow control valve outlet port 128 to move between a first position, which is the position depicted in FIG. 2, and a second position, which is the position depicted in FIG. 3. The pressure control piston 216 is also movably disposed in the valve body 212, and its position is controlled to maintain the pump discharge backpressure above either the first minimum pressure value or the second minimum pressure value, depending on the position of the control pressure select piston 214. More specifically, when the control pressure select piston 214 is in the first position, the pressure control piston 216 maintains the pump discharge backpressure above the first minimum pressure value. Conversely, when the control pressure select piston 214 is in the second position, the pressure control piston 216 maintains the pump discharge backpressure above the second value.

To implement the above-described functionality, the valve body 212 includes an inlet port 218, an outlet port 222, a reference pressure port 224, and a secondary flow sense port 226. The inlet port 218 is coupled to receive at least a portion of the fuel discharged from the high pressure pump 106, and the outlet port 222 is in fluid communication with the primary fuel loads 116-1. The reference pressure port 224 is in fluid communication with the fuel supply line 118 upstream of the high pressure pump 106 (e.g., the pump inlet), and the secondary flow sense port 226 is in fluid communication with the secondary flow control valve outlet port 128.

As FIGS. 2 and 3 also depict, the pressure control piston 216 is disposed between the inlet port 218 and the outlet port 222, and the control pressure select piston 214 is disposed between the reference pressure port 224 and the secondary flow sense port 226. Together, the control pressure select piston 214 and the pressure control piston 216 define three chambers in the valve body 212—a main flow chamber 228, a reference pressure chamber 232, and a secondary flow sense chamber 234. The main flow chamber 228 is in fluid communication with the inlet port 218 and the outlet port 222, the reference pressure chamber 232 is defined between the control pressure select piston 214 and the pressure control piston 216 and is in fluid communication with the reference pressure port 224, and the secondary flow sense chamber 234 is in fluid communication with the secondary flow sense port 226.

A reference load spring 236 is disposed within the reference pressure chamber 232. The reference load spring 236 is disposed between, and supplies a spring force to, the control pressure select piston 214 and the pressure control piston 216. The spring force supplied by the reference load spring 236 to the control pressure select piston 214 urges the control pressure select piston 214 toward the second position, which is the position depicted in FIG. 3. As may be appreciated, the spring force supplied by the reference load spring 236 to the pressure control piston 216 varies based on the position of the position of the control pressure select piston 214. That is, the spring force supplied to the pressure control piston 216 is greater when the control pressure select piston 214 is in the first position (FIG. 2) than when the control pressure select piston 214 is in the second position (FIG. 3). In addition to the spring force supplied from the reference load spring 236, fluid pressures within the main flow chamber 228, the reference pressure chamber 232, and the secondary flow sense chamber 234 also supply forces to the control pressure select piston 214 and the pressure control piston 216. In particular, fluid pressures within the reference pressure chamber 232 and the secondary flow sense chamber 234 supply forces to the control pressure select piston 214, and fluid pressures within the main flow chamber 228 and the reference pressure chamber 232 supply forces to the pressure control piston 216.

The above-described configuration allows the pump discharge backpressure to be maintained above two different minimum pressure values, depending upon whether fuel is being supplied to the secondary fuel loads 116-2, 116-3, 116-4, . . . 116-N. A description of its operation will now be provided. Before doing so, however, it is noted that a flow control orifice 238 is disposed between the secondary flow control valve 112 and the pressurizing valve 114, and more specifically between the secondary flow control valve outlet port 128 and the secondary flow sense chamber 234. The purpose for the flow control orifice 238 will be described further below.

Turning now to an operational description of the secondary flow control valve 112 and the pressurizing valve 114, it may be seen that when the secondary flow control valve 112 is in the closed position, fluid pressure in the secondary flow sense chamber 234 is at a relatively low pressure. The specific value of this pressure may vary, but in the depicted embodiment is essentially equal to the fluid pressure at the inlet of the high pressure pump 106. The fluid pressure in the reference pressure chamber 232 is also equal to, or substantially equal to, the fluid pressure at the inlet of the high pressure pump 106. As a result, the spring force supplied by the reference load spring 236 moves the control pressure select piston 214 to the second position (FIG. 3). As previously noted, the minimum pump discharge backpressure that the pressure control piston 216 maintains is based on the spring force supplied from the reference load spring 236 and the fluid pressure in the reference pressure chamber 232. The relatively lower spring force and the fluid pressure result in the pump discharge backpressure being maintained above the lower second pressure value noted above.

When fuel flow to the secondary fuel loads 116-2, 116-3, 116-4, . . . 116-N is needed or desired, the secondary flow control valve 112 is moved to the open position. As a result, fuel flows through the secondary flow control valve 112 and into the secondary flow sense chamber 234. The fluid pressure in the secondary flow sense chamber 234 will thus increase to the fluid pressure of the secondary flow. The specific value of this fluid pressure may vary, but in the depicted embodiment it is equal to, or at least substantially equal to, the fluid pressure at the high pressure pump 106 outlet. Moreover, the fluid pressure in the reference pressure chamber 232 remains equal to, or substantially equal to, the fluid pressure at the inlet of the high pressure pump 106. The resultant forces acting on the control pressure select piston 214 move it to the first position, increasing the spring force supplied from the reference load spring 236 to the pressure control piston 216 (FIG. 2). The increased spring force results in the pump discharge backpressure being maintained above the first pressure value. As noted above, the first pressure value is greater than the second pressure value.

It was noted above that the purpose of the flow control orifice 238 would be discussed. The flow control orifice 238 is included to limit the rate at which the pressurizing valve 114 adjusts the minimum pump discharge backpressure it maintains from the first pressure value to the second pressure value, and vice-versa. More specifically, the flow control orifice 238 is sized and configured to limit the rate at which the fluid pressure in the secondary flow sense chamber 234 increases and decreases, and thus the rate at which the control pressure select piston 214 moves between the first and second positions.

The system and method described herein provide dual level pressurization control of a fuel supply system based on whether fuel is being supplied to one or more secondary fuel loads. The system and method do not cause difficulty in the scheduling of priority flow during an engine start up sequence, do not generate excessive fuel system heat, and do not increase the horsepower consumption of the fuel pumps 104, 106.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:
1. A fuel pressurization control system, comprising:
a secondary flow control valve including an inlet port and an outlet port, the inlet port adapted to receive fluid discharged from a fuel pump, the secondary flow control valve movable between a closed position, in which the inlet port is fluidly isolated from the outlet port, and an open position, in which the inlet port is in fluid communication with the outlet port; and
a pressurizing valve adapted to receive fuel discharged from the fuel pump at a pump discharge pressure, the pressurizing valve in fluid communication with at least the secondary flow control valve outlet port and comprising:
a control pressure select piston responsive, at least in part, to fuel pressure at the secondary flow control valve outlet port to move between a first position and a second position, and
a pressure control piston controllably movable to maintain the pump discharge pressure above (i) a first value when the control pressure select piston is in the first position and (ii) a second value when the control pressure select piston is in the second position.

2. The system of claim 1, further comprising:
a flow control orifice disposed between the secondary flow control valve outlet port and the pressurizing valve.

3. The system of claim 1, wherein the pressurizing valve further comprises:
a reference load spring disposed between, and supplying a spring force to, the control pressure select piston and the pressure control piston.

4. The system of claim 3, wherein:
- the spring force supplied to the control pressure select piston urges the control pressure select piston toward the second position; and
- the spring force supplied to the pressure control piston varies based on the position of the control pressure select piston.

5. The system of claim 3, wherein the control pressure select piston is further responsive to the spring force supplied thereto to move between the first position and the second position.

6. The system of claim 3, wherein the spring force supplied to the pressure control piston is greater when the control pressure select piston is in the first position than when the control pressure select piston is in the second position.

7. The system of claim 3, wherein the pressurizing valve further comprises:
- a reference pressure chamber adapted to receive fuel supplied to the fuel pump at a pump inlet pressure, the reference pressure chamber defined between the control pressure select piston and the pressure control piston.

8. The system of claim 7, wherein the pump inlet pressure supplies an additional force to the control pressure select piston that urges the control pressure select piston toward the second position.

9. The system of claim 7, wherein the control pressure select piston is further responsive to the pump inlet pressure to move between the first position and the second position.

10. The system of claim 7, wherein the pressure control piston maintains the pump discharge pressure based, at least in part, on (i) the spring force supplied thereto from the reference load spring and (ii) the pump inlet pressure.

11. The system of claim 1, wherein the pressure control valve further comprises:
- an inlet port and an outlet port, the pressure control valve inlet port adapted to receive the fuel from the fuel pump at the pump discharge pressure, the pressure control piston disposed at least partially between the pressure control valve inlet port and the pressure control valve outlet port.

12. The system of claim 1, further comprising:
- a valve actuator coupled to the secondary flow control valve and configured to selectively move the secondary flow control valve between the closed position and the open position.

13. A fuel supply and control system, comprising:
- a fuel pump adapted to receive fuel at a pump inlet pressure and supply the fuel at a pump discharge pressure;
- a metering valve in fluid communication with the fuel pump to receive at least a first portion of the fuel supplied therefrom, the metering valve configured to control fuel flow to one or more primary fuel loads;
- a secondary flow control valve including an inlet port and an outlet port, the inlet port in fluid communication with the fuel pump to receive at least a second portion of the fuel supplied therefrom, the secondary flow control valve movable between an open position, in which the inlet port is in fluid communication with the outlet port and fuel is supplied to one or more secondary fuel loads, and a closed position, in which the inlet port is fluidly isolated from the outlet and fuel is not supplied to the one or more secondary fuel loads; and
- a pressurizing valve in fluid communication with the metering valve and the secondary flow control valve outlet port, the pressurizing valve comprising:
  - a control pressure select piston responsive, at least in part, to fuel pressure at the secondary flow control valve outlet port to move between a first position and a second position, and
  - a pressure control piston controllably movable to maintain the pump discharge pressure above (i) a first value when the control pressure select piston is in the first position and (ii) a second value when the control pressure select piston is in the second position.

14. The system of claim 13, further comprising:
- a flow control orifice disposed between the secondary flow control valve outlet port and the pressurizing valve.

15. The system of claim 13, wherein the pressurizing valve further comprises:
- a reference pressure chamber coupled to receive fuel at the fuel pump inlet pressure, the reference pressure chamber defined between the control pressure select piston and the pressure control piston; and
- a reference load spring disposed within the reference pressure chamber, and supplying a spring force to the control pressure select piston and the pressure control piston.

16. The system of claim 15, wherein:
- the spring force supplied to the control pressure select piston urges the control pressure select piston toward the second position; and
- the spring force supplied to the pressure control piston varies based on the position of the control pressure select piston.

17. The system of claim 15, wherein the spring force supplied to the pressure control piston is greater when the control pressure select piston is in the first position than when the control pressure select piston is in the second position.

18. The system of claim 15, wherein:
- the pump inlet pressure supplies an additional force to the control pressure select piston that urges the control pressure select piston toward the second position;
- the control pressure select piston is further responsive to the pump inlet pressure to move between the first position and the second position; and
- the pressure control piston maintains the pump discharge pressure based, at least in part, on (i) the spring force supplied thereto from the reference load spring and (ii) the pump inlet pressure.

19. The system of claim 13, wherein the pressure control valve further comprises:
- an inlet port and an outlet port, the pressure control valve inlet port adapted to receive the fuel from the fuel pump at the pump discharge pressure, the pressure control piston disposed at least partially between the pressure control valve inlet port and the pressure control valve outlet port.

20. A method of maintaining fuel pump discharge pressure above either a first minimum pressure value or a lower second minimum pressure value in a fuel supply system that is configured to selectively supply fuel to one or more primary fuel loads and one or more secondary fuel loads, the method comprising the steps of:
- sensing whether fuel is being supplied to the one or more secondary loads;
- maintaining the fuel pump discharge pressure above the first minimum pressure value if it is sensed that fuel is being supplied to the one or more secondary loads; and
- maintaining the fuel pump discharge pressure above the lower second minimum pressure value if it is sensed that fuel is not being supplied to the one or more secondary loads.

* * * * *